US008009915B2

(12) United States Patent
Predovic et al.

(10) Patent No.: US 8,009,915 B2
(45) Date of Patent: Aug. 30, 2011

(54) RECOGNITION OF MATHEMATICAL EXPRESSIONS

(75) Inventors: Goran Predovic, Belgrade (YU); Ahmad Abdulkader, Woodinville, WA (US); Bodin Dresevic, Belgrade (YU); Paul A. Viola, Kirkland, WA (US); Milan Vukosavljevic, Belgrade (YU)

(73) Assignee: Microsoft Corporation, Redmond, WA (US)

( * ) Notice: Subject to any disclaimer, the term of this patent is extended or adjusted under 35 U.S.C. 154(b) by 1167 days.

(21) Appl. No.: 11/788,190

(22) Filed: Apr. 19, 2007

(65) Prior Publication Data

US 2008/0260251 A1    Oct. 23, 2008

(51) Int. Cl.
*G06K 9/00* (2006.01)

(52) U.S. Cl. ......... 382/187; 382/119; 382/185; 382/188

(58) Field of Classification Search .................. 382/181, 382/187, 231, 115, 123
See application file for complete search history.

(56) References Cited

U.S. PATENT DOCUMENTS

| | | | |
|---|---|---|---|
| 5,481,626 A | 1/1996 | Matsubayashi | |
| 5,627,914 A | 5/1997 | Pagallo | |
| 5,655,136 A | 8/1997 | Morgan | |
| 7,181,068 B2 | 2/2007 | Suzuki et al. | |
| 2004/0054701 A1 | 3/2004 | Garst | |
| 2004/0090439 A1 | 5/2004 | Dillner | |
| 2006/0001667 A1 | 1/2006 | LaViola, Jr. et al. | |
| 2006/0045337 A1 | 3/2006 | Shilman et al. | |
| 2006/0062466 A1 | 3/2006 | Zou et al. | |
| 2006/0245654 A1 | 11/2006 | Viola et al. | |
| 2006/0280370 A1 | 12/2006 | Viola et al. | |
| 2007/0003147 A1 | 1/2007 | Viola et al. | |

OTHER PUBLICATIONS

Blostein, et al., "Recognition of Mathematical Notation", http://citeseer.ist.psu.edu/cache/papers/cs/5188/http:zSzzSzwww.qucis.queensu.cazSzhomezSzblosteinzSzmathrec.pdf/blostein96recognition.pdf.

Shilman, et al., "Recognition and Grouping of Handwritten Text in Diagrams and Equations", Date: 2004, http://ieeexplore.ieee.org/ie15/9414/29882/01363972.pdf.

Twaakyondo, et al., "Structure Analysis and Recognition of Mathematical Expressions", http://ieeexplore.ieee.org/ie13/4755/13183/00599029.pdf?isNumber=.

*Primary Examiner* — Brian Q Le
*Assistant Examiner* — Edward Park
(74) *Attorney, Agent, or Firm* — Capitol City TechLaw; Richard C. Irving

(57) ABSTRACT

In embodiments consistent with the subject matter of this disclosure, a user may input strokes as digital ink to a processing device. The processing device may partition the input strokes into multiple regions of strokes. A first recognizer and a second recognizer may score grammar objects included in regions and represented by chart entries. The scores may be converted to a converted score, which may have at least a near standard normal distribution. The processing device may present a recognition result based on highest converted scores according to a recurrence formula. The processing device may receive a correction hint with respect to misrecognized strokes and may add a penalty score with respect to chart entries representing grammar objects breaking the correction hint. Incremental recognition may be performed when a pause is detected during inputting of strokes.

6 Claims, 16 Drawing Sheets

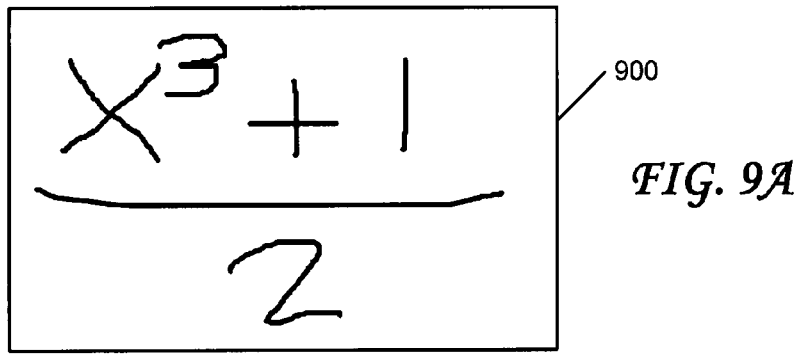
FIG. 9A
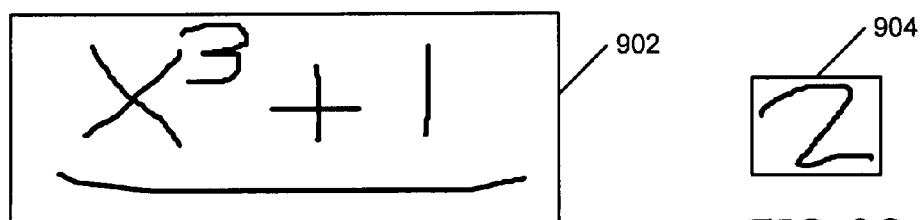
FIG. 9B  FIG. 9C
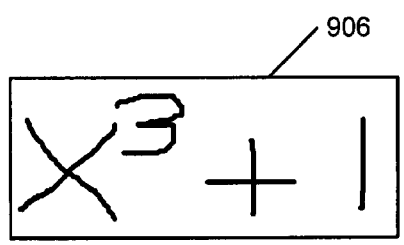  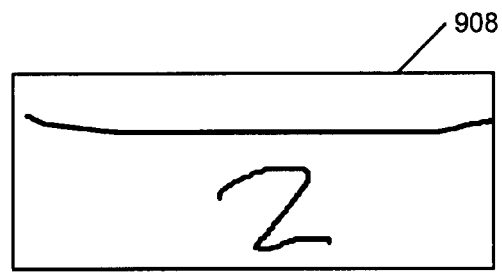
FIG. 9D  FIG. 9E
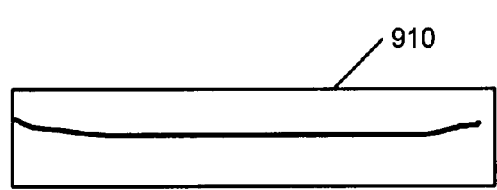  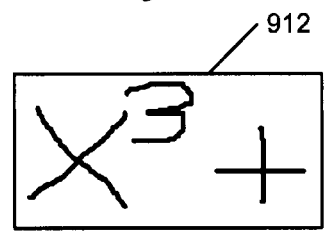
FIG. 9F  FIG. 9G
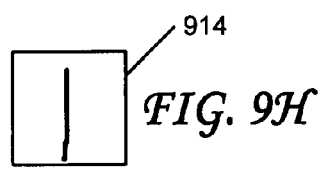  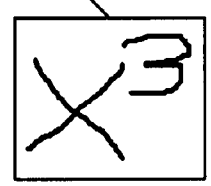
FIG. 9H  FIG. 9I

RECOGNITION OF MATHEMATICAL EXPRESSIONS

BACKGROUND

Many state-of-the-art processing devices, such as tablet personal computers (PCs) or other processing devices, permit a user to provide input as digital ink. The digital ink may include one or more handwritten strokes, which a processing device may display as ink while the one or more handwritten strokes are being input. A handwritten stroke may begin when a writing instrument lands on a writing surface, and may end when the writing instrument is lifted off the writing surface. The writing surface may include a display screen, which may further include a digitizer, and the writing instrument may be an electronic or non-electronic pen, a stylus, a user's own finger, a pointing device, such as, for example, a computer mouse, or another writing instrument.

A user may input one or more handwritten strokes, as digital ink, to form a two-dimensional structure. The two-dimensional structure may include a mathematical expression, a chemical formula, textual characters, numbers, or other two-dimensional structures.

Recognizers for recognizing a digital ink two-dimensional structure, such as, for example, a mathematical expression, may include a structure recognizer and a symbol recognizer, which may be trained in a unified manner. That is, training of the structure recognizer and the symbol recognizer may be performed together.

Existing recognizers may produce a recognition result having a misrecognized portion. The user may attempt to correct the misrecognized portion by selecting the misrecognized portion of the recognition result. In at least one existing recognizer, the user may attempt to correct a misrecognized character of the recognition result by selecting the digital ink corresponding to the misrecognized character. Selecting the misrecognized portion of the recognition result, or selecting the digital ink corresponding to the misrecognized character in the recognition result, may cause one or more alternates to be displayed. The user may select one of the one or more alternates, thereby causing the misrecognized character to be replaced with the selected one of the one or more alternates without re-recognizing the input digital ink. One existing recognizer permits the user to type a correct character from a keyboard when the correct character is not among the displayed one or more alternates.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a user may input one or more handwritten strokes to a processing device, such as a tablet PC, or other processing device, as digital ink. The digital ink may form a mathematical expression. The processing device may recognize the digital ink and may produce and present a recognition result.

The processing device may include a first recognizer for recognizing grammar non-terminal objects, or structures, and a second recognizer for recognizing grammar terminal objects, or symbols. The processing device may partition a region, including multiple handwritten strokes forming a mathematical expression, into a number of regions. The first recognizer and the second recognizer may calculate scores for regions. The calculated scores from the first recognizer and the second recognizer may be converted to converted scores, which may have at least a near standard normal distribution. The processing device may present a recognition result based on determining highest scores according to a recurrence formula.

In some embodiments, the first recognizer and the second recognizer may include custom recognition engines, which may be trained independently.

If a presented recognition result is incorrect, a user may select one or more misrecognized strokes and the processing device may present one or more alternate recognitions to the user. The user may select a correct alternate recognition, or the user may rewrite the selected one or more misrecognized strokes. The multiple handwritten strokes may be re-recognized by the processing device, respecting one or more correction hints.

In some embodiments, the processing device may perform incremental recognition of a number of input handwritten strokes. Incremental recognition may be performed during a pause with respect to inputting strokes. During recognition, score calculations for some regions may be reused, while score calculations for other regions may be recalculated.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
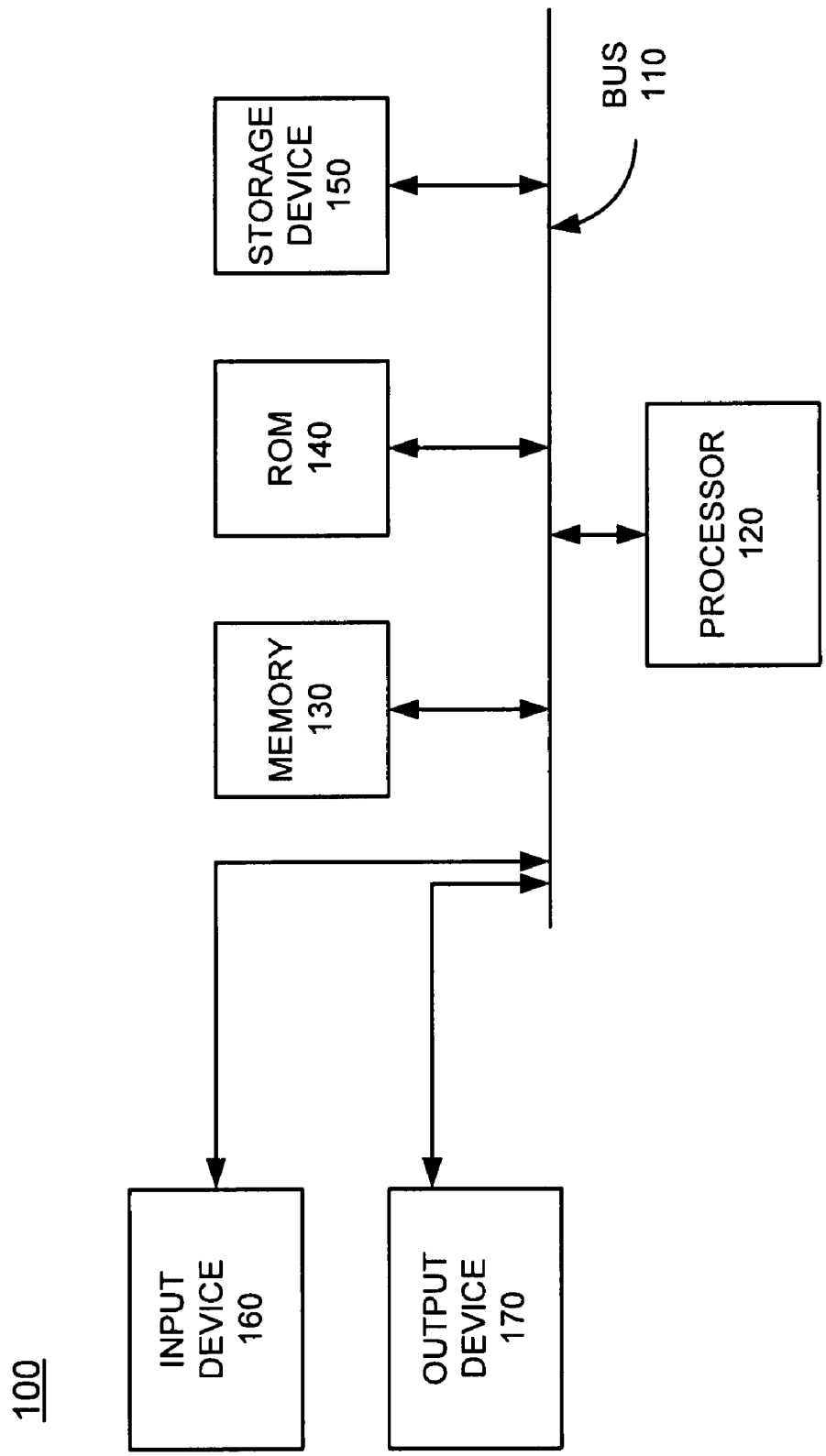
FIG. 1 is a functional block diagram illustrating an exemplary processing device, which may be used in implementations consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a user may input digital ink to a processing device. The digital ink may include one or more handwritten strokes forming a two-dimensional structure, which may include a mathematical expression, or another two-dimensional structure.

The processing device may process the input digital ink to produce a recognition result, which may be presented to the user. In one embodiment, the processing device may include a first recognizer for scoring non-terminal objects or structures and a second recognizer for scoring terminal objects or symbols. In this application, the term "terminal object" refers to a grammar terminal object, or symbol, which is a non-divisible grammar object. Examples of terminal objects may include, but not be limited to, letters that denote variable names, digits, mathematical operators and symbols.

The processing device may partition multiple handwritten strokes forming a mathematical expression, into a number of subsets or regions. The first recognizer may calculate first scores for all non-terminal grammar objects on a given region R and the second recognizer may calculate second scores for terminal grammar objects on a given region R. The processing device may then convert each of the first scores and each of the second scores to a converted score. In embodiments consistent with the subject matter of this disclosure, the converted scores conform to at least a near-standard normal distribution.

The first recognizer and the second recognizer may include custom recognition engines and may be trained independently. If retraining of one of the recognizers is to be performed, another of the recognizers need not be trained.

After recognizing the multiple handwritten strokes forming the mathematical expression, the processing device may present a recognition result. If the recognition result is not correct, a user may select one or more misrecognized strokes and the processing device may present one or more alternate recognitions to the user. The user may select a correct alternate recognition, or the user may rewrite the selected one or more misrecognized strokes. The multiple handwritten strokes may then be re-recognized by the processing device, respecting one or more correction hints, which may include one or more selected alternate recognitions. In one embodiment, all of the handwritten strokes may be re-recognized. In other embodiments, a conveniently chosen subset of the handwritten strokes, which may include the selected one or more misrecognized strokes, may be re-recognized.

In some embodiments consistent with the subject matter of this disclosure, the processing device may perform incremental recognition. For example, as a user inputs a number of strokes to the processing device, the processing device may perform recognition of the input strokes during a pause and may present incremental recognition result to the user. As the user continues to input strokes or provide correction hints to the processing device, score calculations for some regions may be reused when performing recognition, while score calculations for other regions may be recalculated before performing recognition.

Exemplary Processing Device

FIG. 1 is a functional block diagram that illustrates an exemplary processing device 100, which may be used to implement embodiments consistent with the subject matter of this disclosure. In one embodiment, processing device 100 may be a tablet PC. In another embodiment, processing device 100 may be another type of processing device.

Processing device 100 may include a bus 110, a processor 120, a memory 130, a read only memory (ROM) 140, a storage device 150, an input device 160, and an output device 170. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. In one embodiment, memory 130 may include a flash RAM device. Memory 130 may also store temporary variables or other intermediate information used during execution of instructions by processor 120. ROM 140 may include a conventional ROM device or another type of static storage device that stores static information and instructions for processor 120. Storage device 150 may include any type of media for storing data and/or instructions.

Input device 160 may include a display or a touch screen, which may further include a digitizer, for receiving input from a writing device, such as, for example, an electronic or non-electronic pen, a stylus, a user's finger, or other writing device. In one embodiment, input device 160 may include a pointing device, such as, for example, a computer mouse, or other pointing device. Output device 170 may include one or more conventional mechanisms that output information to the user, including one or more displays, or other output devices.

Processing device 100 may perform such functions in response to processor 120 executing sequences of instructions contained in a tangible machine-readable medium, such as, for example, memory 130, or other medium. Such instructions may be read into memory 130 from another machine-readable medium, such as storage device 150, or from a separate device via communication interface (not shown).

Dividing Strokes into Regions

In one embodiment consistent with the subject matter of this disclosure, a processing device may employ a binary grammar to recognize a number of strokes input to a processing device as digital ink to form a mathematical expression. The processing device may divide the strokes into subsets of strokes called regions. One method of dividing strokes into regions is disclosed in U.S. patent application Ser. No. 11/784,889, entitled "Geometric Parsing of Mathematical Expressions", filed in the U.S. Patent and Trademark Office on Apr. 10, 2007. Of course, other methods of dividing strokes into regions may be implemented in other embodiments consistent with the subject matter of this disclosure.

After handwritten or typeset input, including a number of strokes and forming a mathematical expression, is provided to a processing device, such as a tablet PC, or other processing device, according to one embodiment consistent with the subject matter of this disclosure, two auxiliary arrays of strokes, Array_Left and Array_Top, may be defined for a region including the typeset or handwritten input. For example, consider a mathematical expression including n strokes. S may be a set including the n strokes, $S=\{s_1, s_2, \ldots, s_n\}$ Array_Left may be set to strokes $\{a_1, a_2, \ldots, a_n\}$ and Array_Top may be set to strokes $\{b_1, b_2, \ldots, b_n\}$ which may be sorted permutations of the set S. Thus, Array_Left may satisfy an ordering relation, such that $a_1 \leq a_2 \leq \ldots \leq a_n$. Similarly, Array_Top may satisfy and ordering relation, such that $b_1 \leq b_2 \leq \ldots \leq b_n$.

The ordering relations may be defined such that:

In Array_Left, $s_i \leq s_j$ if and only if a leftmost coordinate of RHULL(stroke $s_i$) is less than or equal to a leftmost coordinate of RHULL(stroke $s_j$), where RHULL is defined as a smallest axis aligned rectangle which includes one or more strokes; and In Array_Top, $s_i \leq s_j$ if and only if a topmost coordinate of RHULL(stroke $s_i$) is less than or equal to a topmost coordinate of RHULL(stroke $s_j$).

Figure 2:
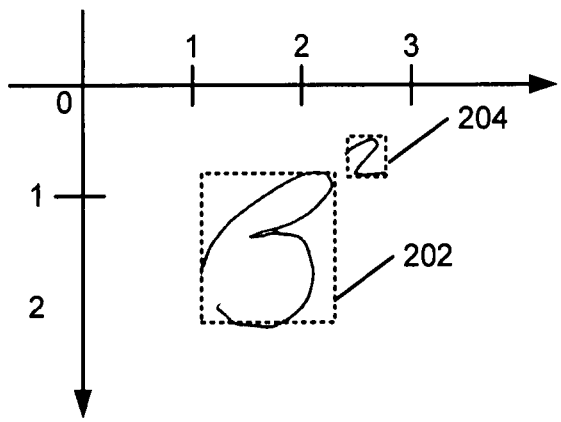
FIGS. 2-7 illustrate exemplary mathematical expressions, which may be parsed by embodiments consistent with the subject matter of this disclosure.

Consider, as an example, FIG. 2, in which $(S=\{s_1, s_2\}, s_1=\beta, s_2=2)$. In Array_Left, one can see that $s_1 \leq s_2$ because a leftmost coordinate of RHULL("$\beta$") 202 is less than a leftmost coordinate of RHULL("2") 204. In Array_Top, one can see that $s_2 \leq s_1$ because a topmost coordinate of RHULL("2") 204 is less than a topmost coordinate of RHULL("$\beta$") 202.

In an embodiment, partitioning may begin by examining a set of strokes included in a region R. Each partition of a region may define two new regions, which may be sub-regions of the partitioned region. For example, assuming that a region R is partitioned such that $R=\{R_1, R_2\}$, then $R_1 \cap R_2 = 0$ and $R_1 \cup R_2 = R$.

In a first stage, strokes of a region may be ordered according to a left-to-right ordering relation. In one embodiment, a global array, which we call Global-Array-Left, may be created on a complete set of input strokes. Auxiliary array Array_Left may be created for a sub-region by going through Global-Array-Left and only including, in order, strokes of Global-Array-Left that belong to the sub-region. Auxiliary array Array-Left may be used to determine whether one of a group of rules or conditions is satisfied among the strokes. In one embodiment, the conditions may be a left-right simple strong condition, a superscript condition, a subscript condition, and a brackets condition.

According to the left-right simple strong condition, a region, R, of strokes $r_1, r_2, \ldots, r_k$, may be partitioned into two sub-regions, $R_1$ and $R_2$, where $R_1=\{r_1, r_2, \ldots, r_l\}$ and $R_2=\{R_{l+1}, r_{l+2}, \ldots, r_k\}$, if a rightmost coordinate of RHULL($R_1$) is less than or equal to a leftmost coordinate of RHULL($r_{l+1}$). That is, a region, R, may be partitioned into two regions, $R_1$ and $R_2$, when the regions may be separated by a vertical line. No more than k−1 partitions of the form $R_1=\{r_1, r_2, \ldots, r_l\}$ and $R_2=\{R_{l+1}, r_{l+2}, \ldots, r_k\}$ may be created from region R using the left-to-right ordering relation because there are only k−1 possible ways of choosing "l". A number of partitions that could be created in this step is linear compared to a number of strokes included in the region, while a number of all possible partitions is exponential.

The superscript condition may be satisfied with respect to strokes $r_1$ and $r_{l+1}$ when the strokes $r_1$ and $r_{l+1}$ are positioned such that stroke $r_1$ is positioned like a base and stroke $r_{l+1}$ is positioned like a superscript to the base. That is, the superscript condition is satisfied with respect to strokes $r_1$ and $r_{l+1}$ when a center of mass of stroke $r_{l+1}$ is right and up with respect to a center of mass of stroke $r_1$. A center of mass of a stroke may be determined by calculating an average horizontal axis coordinate and an average vertical axis coordinate of the stroke. Partitioning of a region satisfying the superscript condition may result in a first sub-region including a stroke representing the superscript and a second sub-region including remaining strokes not included in the first sub-region.

The subscript condition may be satisfied with respect to strokes $r_1$ and $r_{l+1}$ when the strokes $r_1$ and $r_{l+1}$ are positioned such that stroke $r_1$ is positioned like a base and stroke $r_{l+1}$ is positioned like a subscript to the base. That is, the subscript condition is satisfied with respect to strokes $r_1$ and $r_{l+1}$ when a center of mass of stroke $r_{l+1}$ is right and down with respect to a center of mass of stroke $r_1$. Partitioning of a region satisfying the subscript condition may result in a first sub-region including a stroke representing the subscript and a second sub-region including remaining strokes not included in the first sub-region.

Figure 3:
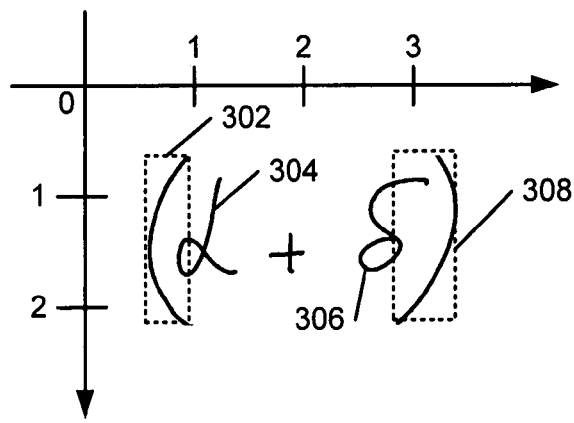

The brackets condition may be satisfied with respect to strokes $r_1$ and $r_{l+1}$ when (1) a height of stroke $r_1$ is sufficiently larger than a width of stroke $r_1$ and a center of mass of stroke $r_{l+1}$ is between a top coordinate and a bottom coordinate of RHULL($r_1$), or (2) when a height of stroke $r_{l+1}$ is sufficiently larger than a width of stroke $r_{l+1}$ and a center of mass of stroke $r_1$ is between a top coordinate and a bottom coordinate of RHULL($r_{l+1}$). This condition can be observed by referring to FIG. 3, in which a height of RHULL("(") 302 is sufficiently larger than a width of stroke "(" 304 and a center of mass of stroke "$\alpha$" 304 is between a top and bottom coordinate of RHULL("(") 302. Further, a height of RHULL(")") 308 is sufficiently larger than a width of stroke ")" 306 and a center of mass of stroke "$\delta$" 306 is between a top coordinate and a bottom coordinate of RHULL(")") 308. Partitioning of a region satisfying the brackets condition may result in a first sub-region including a stroke representing a bracket and a second sub-region including remaining strokes not included in the first sub-region.

In a second stage, strokes may be arranged according to a top-down ordering relation. In one embodiment, a global array, which we call Global-Array-Top, may be previously created on a complete set of strokes. Auxiliary array Array-Top may be created for a sub-region by going through Global-Array-Top and only including, in order, strokes of Global-Array-Top that belong to the sub-region. Auxiliary array Array-Top may be used to determine whether one of a group of conditions is satisfied among the strokes. In one embodiment, the conditions may be a top-down simple strong condition and a horizontal fraction condition.

According to the top-down simple strong condition, a region, R of strokes $r_1, r_2, \ldots, r_k$, may be partitioned into two sub-regions, $R_1$ and $R_2$, where $R_1=\{r_1, r_2, \ldots, r_l\}$ and $R_2=\{r_{l+1}, r_{l+2}, \ldots, r_k\}$, if a bottommost coordinate of RHULL($R_1$) is less than or equal to a topmost coordinate of RHULL($r_{l+1}$). That is, a region, R, may be partitioned into two regions, $R_1$ and $R_2$, when a horizontal line could separate the regions. No more than k−1 partitions of the form $R_1=\{r_1, r_2, \ldots, r_l\}$ and $R_2=\{R_{l+1}, r_{l+2}, \ldots, r_k\}$ may be created from region R using the top-down ordering relation because there are only k−1 possible ways of choosing "l". A number of partitions that could be created in this step is linear compared to a number of strokes included in the region, while a number of all possible partitions is exponential.

The horizontal fraction condition may be satisfied when the strokes $r_1$ and $r_{l+1}$ have a feature that a fraction line has. A fraction line may be nearly or completely horizontal, at least almost as wide as a complete sub region, and may be easily detected. Assuming that stroke $r_{i+1}$ is the horizontal fraction line, most or all of $r_i$ may be above the horizontal fraction line.

Figure 4:
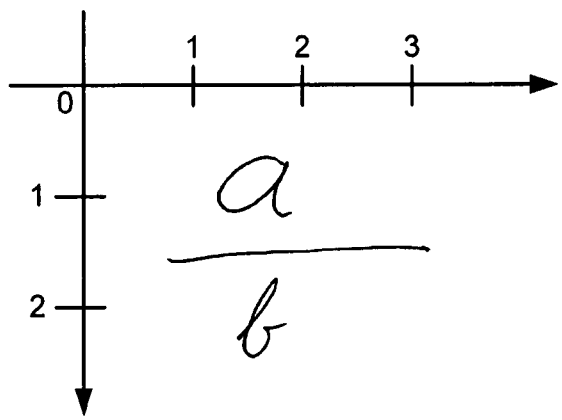
Figure 5:
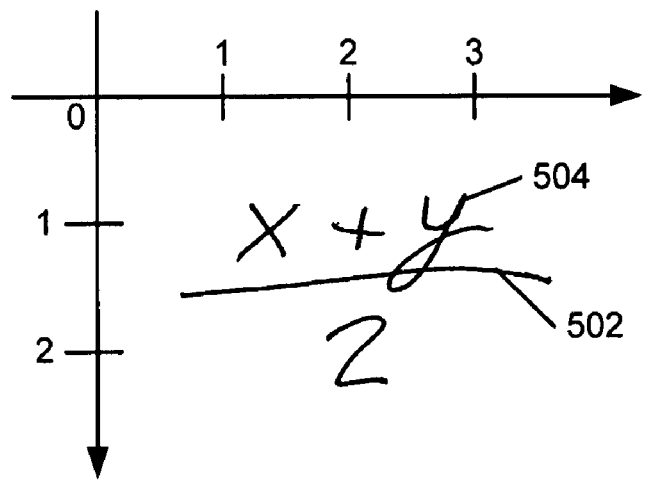

FIG. 4 illustrates an example of strokes forming a fraction. In this example, the top-down simple strong condition may create a correct partition because there is no geometric overlap that would hinder partitioning. However, in FIG. 5, because stroke 504 crosses horizontal fraction line 502, the top-down simple strong condition cannot separate stroke 504 from fraction line 502 because a bottommost coordinate of RHULL("y") is not smaller than a topmost coordinate of horizontal fraction line 502. Using the horizontal fraction condition, a correct partition may be created to separate stroke 504 from horizontal fraction line 502.

In a third stage, an ordering type is outside-inside. In this stage, a region R may be partitioned into $R_1$ and $R_2$, where $R_1=\{r_1, r_2, \ldots, r_m\}$ and $R_2$=remaining strokes of R not in $R_1$, if and only if strokes of $R_1$ look like a square root symbol, √, and strokes of $R_2$ are almost completely within $R_1$. When the strokes of $R_1$ look like a square root symbol and the strokes of $R_2$ are almost completely within $R_1$, a square root condition is satisfied.

In order to detect a square root symbol in $R_1$, several first strokes may be combined from a left side of region $R_1$ with several first strokes from a top of region $R_1$. In this way, a square root symbol drawn with one or more strokes may be detected. In one embodiment, a maximum number of strokes to search for in $R_1$ may be a configurable parameter. Auxiliary arrays, Array-Left and Array-Top, may be used in order to find the one or more strokes that make up the square root symbol. The square root condition may be satisfied when a leftmost coordinate of RHULL($R_1$) is smaller than a leftmost coordinate of RHULL($R_2$) and a topmost coordinate of RHULL($R_1$) is smaller than a topmost coordinate of RHULL($R_2$). A portion of region $R_2$ may be outside of region $R_1$ at a bottom and right side portion of the square root symbol.

Figure 6A:
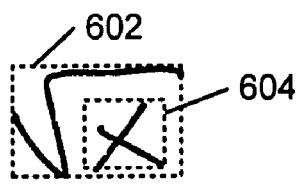
Figure 6B:
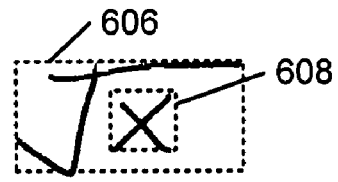
Figure 6C:
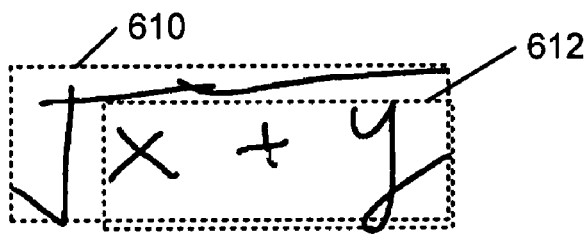

With respect to an example illustrated in FIG. 6A, one can see that a leftmost coordinate of RHULL($R_1$) 602 is smaller than a leftmost coordinate of RHULL($R_2$) 604 and a topmost coordinate of RHULL($R_1$) 602 is smaller than a topmost coordinate of RHULL($R_2$) 604. With respect to an example illustrated in FIG. 6B having a two-stroke square root symbol, a leftmost coordinate of RHULL($R_1$) 606 is smaller than a leftmost coordinate of RHULL($R_2$) 608 and a topmost coordinate of RHULL($R_1$) 606 is smaller than a topmost coordinate of RHULL($R_2$) 608. With respect to an example illustrated in FIG. 6C having a three stroke square root symbol, a leftmost coordinate of RHULL($R_1$) 610 is smaller than a leftmost coordinate of RHULL($R_2$) 612 and a topmost coordinate of RHULL($R_1$) 610 is smaller than a topmost coordinate of RHULL($R_2$) 612.

Figure 7:

In a fourth stage, ordering type may be diagonal. In this stage, a region R may be partitioned into $R_1$ and $R_2$, where $R_1=\{r_1, r_2, \ldots, r_m\}$ and $R_2$=remaining strokes of R not in $R_1$, if and only if a diagonal condition is satisfied. The diagonal condition may be satisfied if there is a stroke $r_x$ in R, such that $r_x$ represents a diagonal line from an approximate bottom-left corner of RHULL(R) to an approximate top-right corner of RHULL(R). The diagonal condition and diagonal ordering may be used to parse integer fractions such as an integer fraction shown in FIG. 7, which satisfies the diagonal condition because of diagonal line 702. Thus, the strokes of FIG. 7 may be parsed into a region including "1" and "/", and a second region in including "2". Further parsing of the region including strokes "1" and "/" may create a partition with a first region including stroke "1" and a second region including stroke "/", again using the diagonal condition. Another parsing of FIG. 7 may result in a region including "1" and a second region including "/" and "2".

Figure 8A:
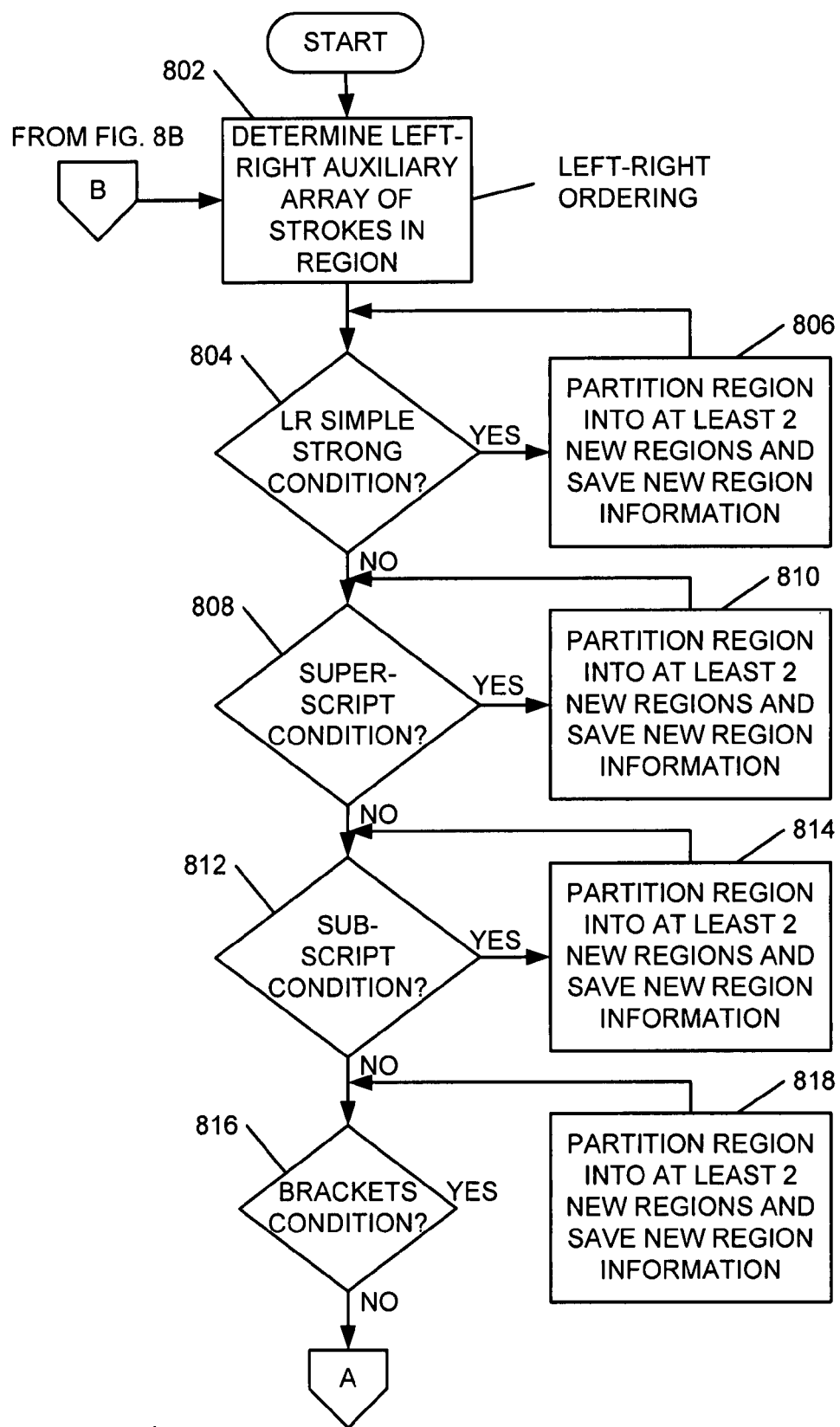
FIGS. 8A-8B are flowcharts, which illustrate a process for partitioning input strokes into a number of regions in one embodiment consistent with the subject matter of this disclosure.
Figure 8B:
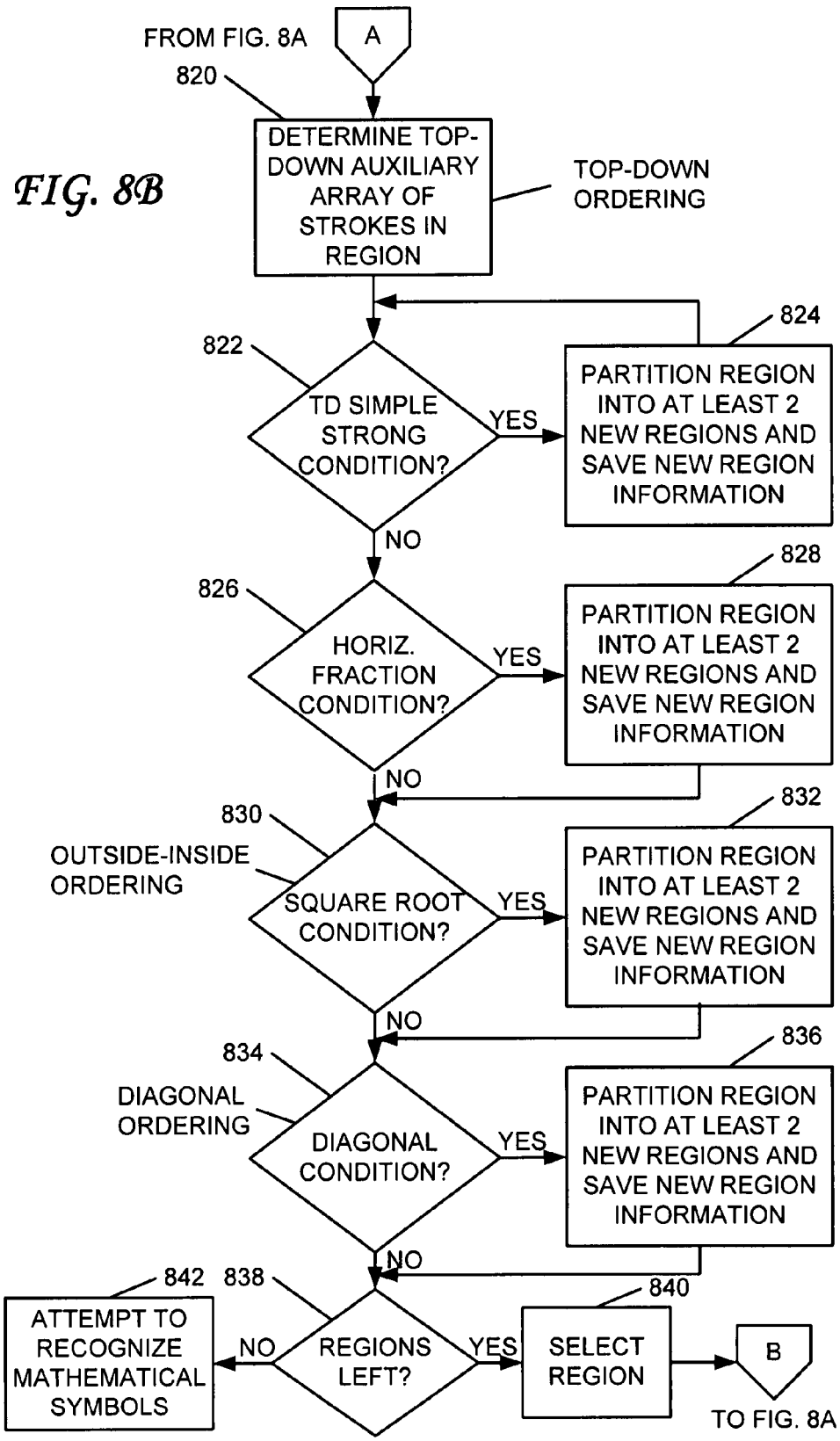

FIGS. 8A and 8B show an exemplary flowchart of processing, which may be performed in embodiments consistent with the subject matter of this disclosure for parsing a mathematical expression. A processing device, such as, for example, processing device 100, may arrange an auxiliary array, Array_Left, such that strokes representing a mathematical expression in a region may be ordered according to a left-right ordering relation, as previously described (act 802). Next, the processing device may determine whether a left-right simple strong condition is satisfied from among the strokes of the region (act 804). As previously mentioned, the left-right simple strong condition is satisfied if a rightmost coordinate of RHULL($R_1$) is less than or equal to a leftmost coordinate of RHULL($r_{i+1}$), where $R_1=\{r_1, r_2, \ldots, r_i\}$. If the left-right simple strong condition is satisfied, then the region may be partitioned into 2 or more regions. In one embodiment, the region may be partitioned into $R_1$ and $R_2$, where $R_2=\{r_{i+1}, r_{i+2}, \ldots, r_k\}$ and information with respect to the newly partitioned regions may be saved (act 806). Act 804 may be repeated to determine whether another partitioning of the region may satisfy the left-right simple strong condition.

If, at act 804, the processing device does not find any partitions or any additional partitions satisfying the left-right simple strong condition (assuming some partitions were previously created) with respect to the region being examined, then the processing device may determine whether a superscript condition is satisfied by the strokes in the region being examined (act 808). The superscript condition is satisfied when stroke $r_i$ is positioned as a base and stroke $r_{i+1}$ is positioned as a superscript, having a center of mass in a position up and right with respect to stroke $r_i$. If the subscript condition is satisfied, then the region being examined may be partitioned into at least two regions, according to the subscript condition, and information with respect to the newly partitioned regions may be saved (act 810). In one embodiment, the region may be partitioned into exactly two regions. Act 808 may be repeated to determine whether another partitioning of the region may satisfy the superscript condition.

If, at act 808, the processing device does not find any partitions or any additional partitions satisfying the subscript condition, (assuming some partitions were previously created) with respect to the region being examined, then the processing device may determine whether a subscript condition is satisfied by the strokes in the region being examined (act 812). The subscript condition is satisfied when stroke $r_i$ is positioned like a base and stroke $r_{i+1}$ is positioned like a subscript, having a center of mass being in a position down and right with respect to stroke $r_i$. If the subscript condition is satisfied, then the region being examined may be partitioned into at least two regions, according to the subscript condition, and information with respect to the newly partitioned regions may be saved (act 814). In one embodiment, the region may be partitioned into exactly two regions. Act 812 may be repeated to determine whether another partitioning of the region may satisfy the subscript condition.

If, at act 812, the processing device does not find any partitions or any additional partitions satisfying the subscript condition, (assuming some partitions were previously created) with respect to the region being examined, then the processing device may determine whether a brackets condition is satisfied by the strokes in the region being examined (act 816). The brackets condition is satisfied when a height of stroke $r_i$ is sufficiently larger than a width of the stroke $r_i$ and a center of mass of stroke $r_{i+1}$ is between a topmost coordinate and a bottommost coordinate of RHULL($r_1$), or when a height of stroke $r_{1+1}$ is sufficiently larger than a width of the stroke $r_{1+1}$ and a center of mass of stroke $r_1$ is between a topmost coordinate and a bottommost coordinate of RHULL ($r_{1+1}$). If the brackets condition is satisfied, then the region being examined may be partitioned into at least two regions, according to the brackets condition, and information with respect to the newly partitioned regions may be saved (act 818). In one embodiment, the region may be partitioned into exactly two regions. Act 816 may be repeated to determine whether another partitioning of the region may satisfy the brackets condition.

If, at act 816, the processing device does not find any partitions or any additional partitions satisfying the brackets condition, (assuming some partitions were previously created) with respect to the region being examined, then a top-down ordering stage may be entered and the processing device may then arrange an auxiliary array, Array_Top, such that strokes representing at least a portion of the mathematical expression in a region may be ordered according to a top-down ordering relation, as previously described (act 820; FIG. 8B). Next, the processing device may determine whether a top-down simple strong condition is satisfied from among the strokes of the region (act 822). As previously mentioned, the top-down simple strong condition is satisfied if a bottommost coordinate of RHULL($R_1$) is less than or equal to a topmost coordinate of RHULL($r_{1+1}$), where $R_1=\{r_1, r_2, \ldots, r_1\}$. If the top-down simple strong condition is satisfied, then the region may be partitioned into 2 or more regions. In one embodiment, the region may be partitioned into exactly two regions $R_1$ and $R_2$, where $R_2=\{r_{1+1}, r_{1+2}, \ldots, r_k\}$ and information with respect to the newly partitioned regions may be saved (act 824). Act 822 may be repeated to determine whether another partitioning of the region may satisfy the top-down simple strong condition.

If, at act 822, the processing device does not find any partitions or any additional partitions satisfying the top-down simple strong condition (assuming some partitions were previously created) with respect to the region being examined, the processing device may determine whether a horizontal fraction condition is satisfied by the strokes in the region being examined (act 826). The horizontal fraction condition is satisfied when a horizontal stroke is at least almost as wide as the region being examined. If the horizontal fraction condition is satisfied, then the region being examined may be partitioned into at least two regions, one of which may include a stroke corresponding to the horizontal fraction line, and information with respect to the newly partitioned regions may be saved (act 828). In one embodiment, the region may be partitioned into exactly two regions.

Next, an outside-inside ordering stage may begin. In this stage, the region being examined may be partitioned into at least two newly created regions when a first region appears to be a square root symbol and a second region is completely or almost completely inside the first region (act 830). In one embodiment, the region may be partitioned into exactly two regions. As previously mentioned, several first strokes from a left side of the region being examined may be combined with several first strokes from a top of the region being examined, such that a square root symbol including one or more strokes may be detected. Further, the square root condition is satisfied when a leftmost coordinate of RHULL(first region) is smaller than a leftmost coordinate of RHULL(second region) and a topmost coordinate of RHULL(first region) is smaller than a topmost coordinate of RHULL(second region). If the processing device determines that the square root condition is satisfied, then the processing device may partition the region into at least two new regions, according to the square root condition, and information with respect to the new regions may saved (act 832).

If, at act 830, the processing device does not find any partitions satisfying the square root condition with respect to the region being examined, a diagonal ordering stage may be entered and the processing device may determine whether a diagonal condition is satisfied by the strokes in the region being examined (act 834). The diagonal condition is satisfied if and only there exists a stroke in the region being examined going from approximately a bottom left corner of RHULL (Region) to approximately a top right corner of RHULL (Region). If the diagonal condition is satisfied, then the region may be partitioned into at least two regions, one of which may include the stroke satisfying the diagonal condition, and information with respect to the newly partitioned regions may be saved (act 836). In one embodiment, the region may be partitioned into exactly two regions.

If, at act 834, the processing device does not find any partitions satisfying the diagonal condition with respect to the region being examined, then the processing device may determine whether there are any additional regions to examine, such as newly created sub-regions created during partitioning (act 838). If additional regions remain to be examined, then the processing device may select one of the regions (act 840). In some embodiments, the processing device may select one of the regions having a largest number of strokes. The processing device may then repeat acts 802 through 840.

If, at act 838, the processing device determines that no regions remain to be examined, then all mathematical symbols of the mathematical expression may be included in at least some of the regions created by this process and a symbol recognizer may be used to recognize the mathematical symbols (act 842).

Recognizers

FIGS. 9A-2N illustrate an example in which strokes of an input region 900 may be divided, or partitioned, into a number of regions. FIGS. 9A-9N illustrate one way in which strokes of input region 200 may be divided, or partitioned. In other embodiments, input region 900 may be divided, or partitioned to create different regions. For example, a user may enter strokes into input region 900 to form a mathematical expression, $$\frac{X^3+1}{2}.$$

Figure 9J:
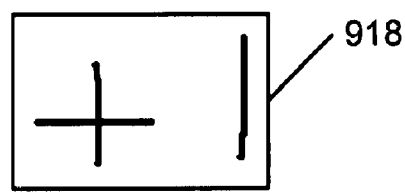
FIGS. 9A-9N illustrate an example of partitioning input strokes into a number of regions in an embodiment consistent with the subject matter of this disclosure.
Figure 9K:
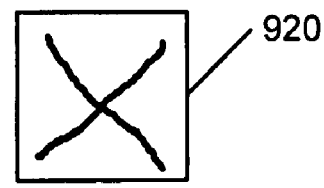
Figure 9L:
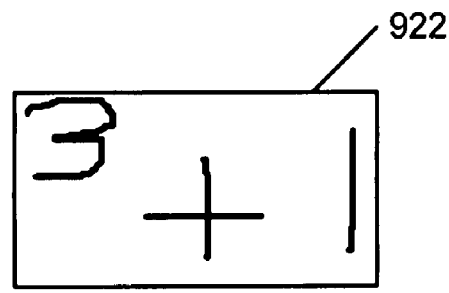
Figure 9M:
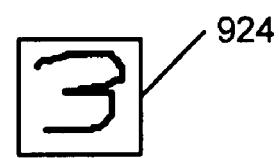
Figure 9N:
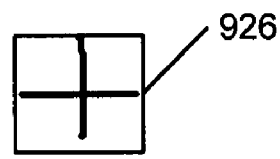

The processing device may divide input region 900 into a number of groups of two regions, such as a group including a region 902 (FIG. 9B) and a region 904 (FIG. 9C), and another group including a region 906 (FIG. 9D) and a region 908 (FIG. 9E). Regions 902, 906 and 908 include a structure, or a non-terminal object, and may be further divided. Region 904 includes a terminal object, or symbol, and may not be divided further. Region 902 may be divided into a group including a region 910 (FIG. 9F) and region 906, of which region 910 includes a terminal object, or symbol. Region 906 may be further divided into groups of two regions including a region 912 (FIG. 9G) and a region 914 (FIG. 9H), which includes a terminal object, or symbol, a region 916 (FIG. 9I) and a region 918 (FIG. 9J), and a region 920 (FIG. 9K) and a region 922 (FIG. 9L). Region 918 may be divided into a region 926 (FIG. 9N) and region 914. Region 922 (FIG. 9M) may be divided into a region 924 (FIG. 9M) and region 918. A region may be divided, such that a union of two regions formed from the region may include all of the strokes of the divided region, and the two regions may have no single stroke in common.

Figure 10:
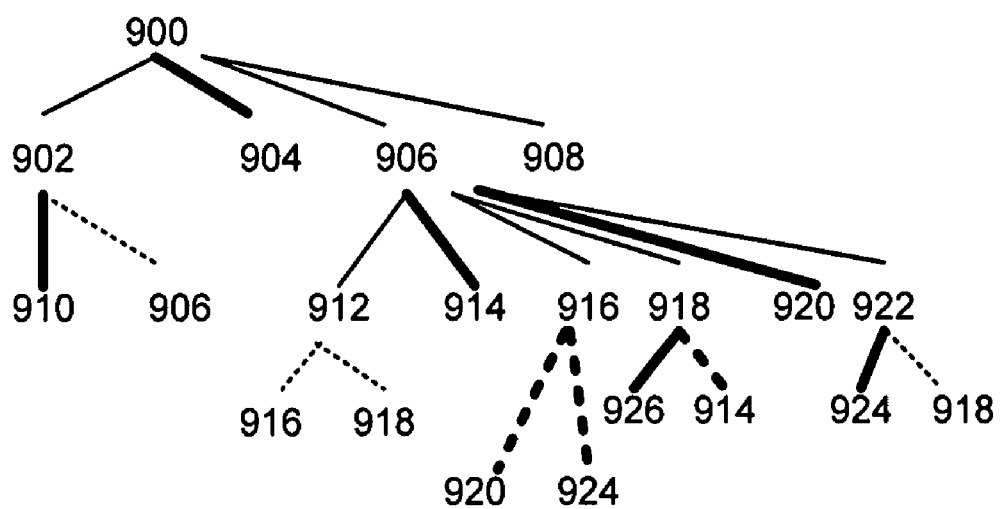
FIG. 10 is a chart illustrating the partitioning of the input strokes with respect to FIGS. 9A-9N.

FIG. 10 is a chart illustrating partitioning of region 900, as discussed above. A thick line indicates partitioning into a region having a single terminal object and no non-terminal object, and a dotted line indicates partitioning into a region shown elsewhere in the chart.

One approach, which may be employed in embodiments consistent with the subject matter of this disclosure, is called chart parsing. Chart parsing is a well-known concept in which an attempt is made to fill entries of a chart, C(X, R), where "C" is a parsing score, "X" is a non-terminal object or a terminal object, and "R" represents a set of input strokes. Each entry of the chart may store a best score of a non-terminal object X or a terminal object X as an interpretation of a subset of input strokes. A score of any non-terminal object X may be expressed as a recurrence formula:

$$C(X, R_0) = \max_{\substack{X \to BC \\ R_1 \cap R_2 = 0 \\ R_1 \cup R_2 = R_0}} C(B, R_1) + \quad \text{(Eqn. 1)}$$

$$C(C, R_2) + \text{structure}(X \to BC, R_0, R_1, R_2)$$

where $\{X \to BC\}$ ranges over all productions, or partitioning for X. B and C may be non-terminal objects or terminal objects, independently. $R_0$ is a subset of input strokes (a region). $R_1$ and $R_2$ are subsets of $R_0$ (called sub-regions or partitions). Essentially, equation 1 states that a score for non-terminal object X may be computed by finding a high score decomposition of non-terminal object X into two disjoint sets.

The term, structure $(X \to BC, R_0, R_1, R_2)$, of equation 1 is a score for interpreting a partition $(R_0, R_1, R_2)$ as a binary production (structure) $X \to BC$ on a subset of strokes $R_0$. This score may be called a structure score. The first two summands of equation 1 may be computed by a processing device using the above recurrence formula, equation 1. When a region includes a terminal object "x", or symbol, the processing device may calculate a score according to:

$$C(x, R) = \text{symbol}(x, R) \quad \text{(Eqn. 2)}$$

where x is a terminal object, or symbol, and R is a region of strokes. The score calculated by equation 2 may be called a symbol score. Thus, equation 1 may be a sum of symbol scores and structure scores.

In embodiments consistent with the subject matter of this disclosure, a processing device may employ a first recognizer, for recognizing structures, and a second recognizer, for recognizing terminal objects, or symbols. Each of the first recognizer and the second recognizer may be executed over a large quantity of input data, or strokes, forming mathematical expressions. Each of the first recognizer and the second recognizer may compute first scores and second scores, respectively, over the input data. A sample mean, $m_{str}$, may be computed with respect to the first scores, and a sample mean, $m_{sym}$, may be computed with respect to the second scores. A sample deviation, $d_{str}$, may be computed with respect to the first scores, and a sample deviation, $d_{sym}$, may be computed with respect to the second scores. A direction constant may be determined with respect to symbol and structure scores. For example, a direction constant, dir, with respect to a recognizer, may be (+1) if the recognizer produces a higher score for a better score, and the direction constant, dir, may be (−1) if the recognizer produces a lower score for a better score. A direction constant for the first recognizer may be referred to as $\text{dir}_{str}$, and a direction constant for the second recognizer may be referred to as $\text{dir}_{sym}$.

Each of the first scores may be converted to a converted score according to:

$$\text{converted\_score} = T_{str} \times \text{dir}_{str} \times \frac{\text{first\_score} - m_{str}}{d_{str}} \quad \text{(Eqn. 3)}$$

where converted_score is a converted score and $T_{str}$ is a parameter obtained during training of the first recognizer. Each of the second scores may be converted according to:

$$\text{converted\_score} = T_{sym} \times \text{dir}_{sym} \times \frac{\text{second\_score} - m_{sym}}{d_{sym}} \quad \text{(Eqn. 4)}$$

where $T_{sym}$ is a parameter obtained during training of the second recognizer. The converted scores may be used with the recurrence formula, equation 1. $T_{str}$ and $T_{sym}$ may be positive real numbers. In one embodiment, $T_{sym}$ may be set to 1 and $T_{str}$ may be adjusted. In another embodiment, $T_{str}$ may be set to 1 and $T_{sym}$ may be adjusted. In some embodiments, $T_{str}$ may be set to a value between 0 and 1, while $T_{sym}$ may be set to a value of 1. In such embodiments, symbol scores have higher importance than structure scores. In some embodiments, $T_{str}$ and/or $T_{sym}$ may be determined by a trial and error approach, such as, picking a value for $T_{str}$ and/or $T_{sym}$ that provides a highest accuracy on a fixed test set. In other embodiments, a training process may be employed, such as, for example, a training process known to those of ordinary skill in the art.

One effect of equations 3 and 4 is to create a standard normal distribution (a Gaussian distribution with a mean of zero and a variance of T) of the converted scores. In some embodiments consistent with the subject matter of this disclosure, a score function of a recognizer, such as the first recognizer, the second recognizer, or other recognizers, may be a near-continuous function of input parameters and a distribution of scores produced by the recognizers may be near-Gaussian. In other embodiments, the recognizers may not have a score function that is a near-continuous function of the input parameters and a distribution of scores may not be near-Gaussian.

In one embodiment, the first recognizer and the second recognizer may be custom recognizers such as, for example, a structure recognizer using an implementation of neural networks and an Example Based Symbol Recognizer. In other embodiments, other recognizers may be used.

Exemplary Processing

Recognizers

Figure 11:
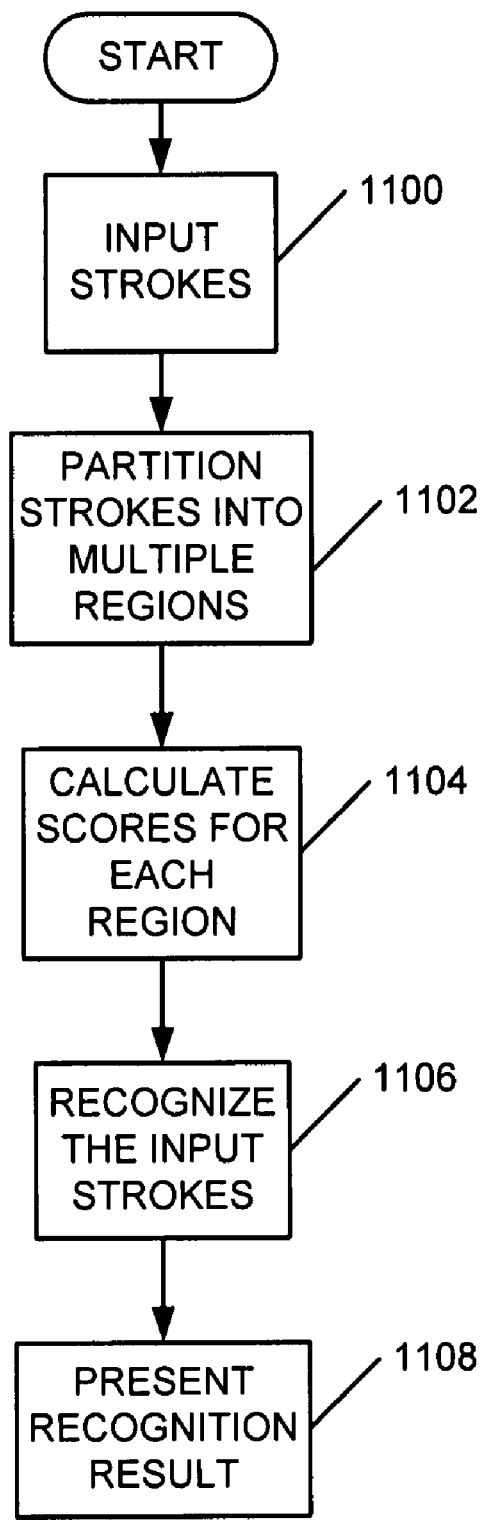
FIG. 11 is a flowchart illustrating an exemplary process for inputting strokes, partitioning strokes into multiple regions, calculating scores for each of the regions, and presenting a recognition result.

FIG. 11 is a flowchart of an exemplary process, which may be performed by a processing device in embodiments consistent with the subject matter of this disclosure. The process may begin with a processing device, such as, for example, processing device 100, or another processing device, receiving input strokes (act 1100). The input strokes may be made by a user with a writing instrument, such as, for example, an electronic pen, a non-electronic pen, a stylus, a user's finger, or other writing instrument, on an input device, such as, for example, a touch screen with a digitizer. In other embodiments, the input strokes may be made using a pointing device, such as, for example, a computer mouse, a trackball device, or other pointing device. The input strokes may form a mathematical expression.

The processing device may then partition, or divide the input strokes into a number of regions, each of which may include a subset of the input strokes (act 1102). In one embodiment, the processing device may divide the input strokes into pairs of regions, as previously described.

Figure 12:
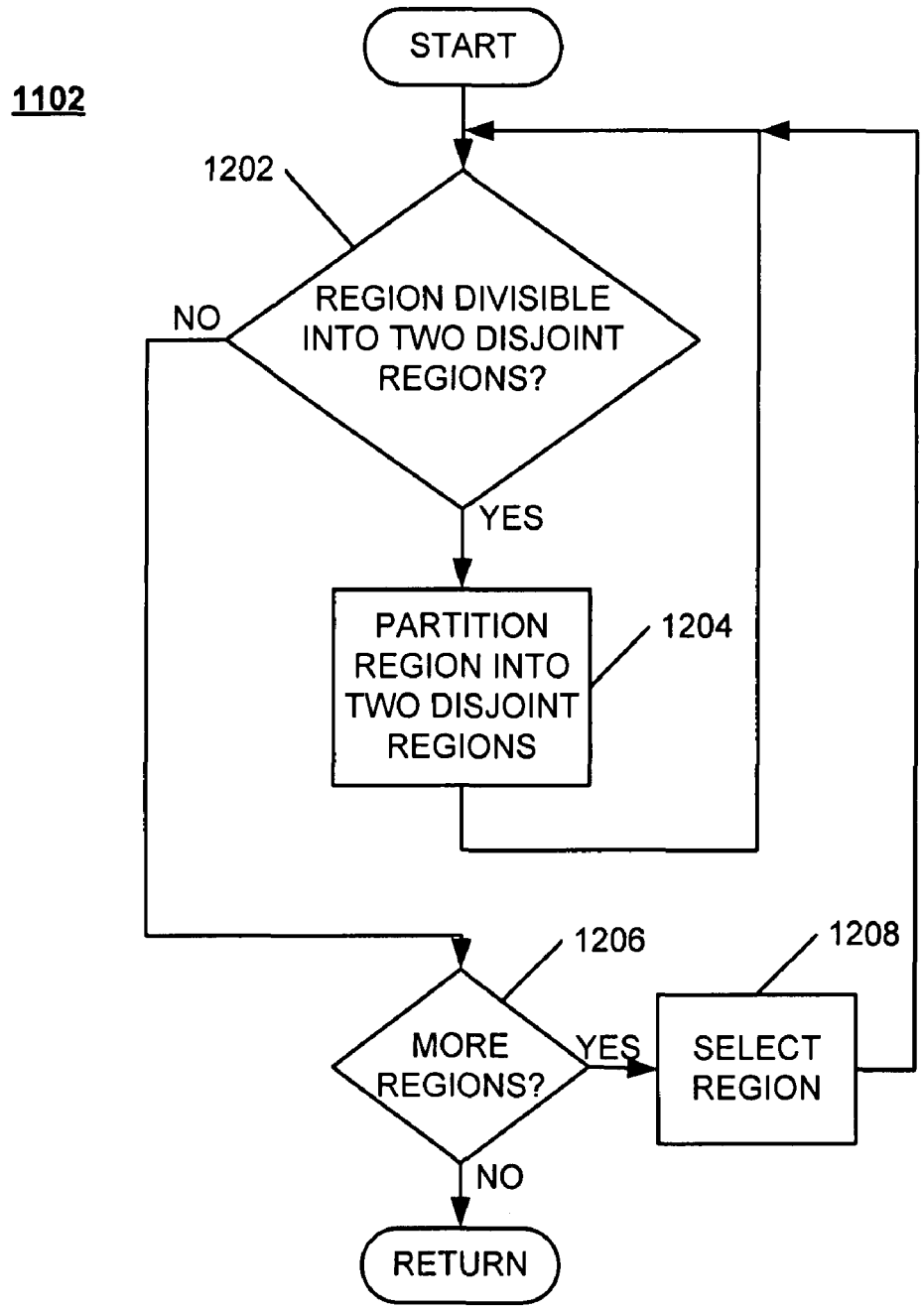
FIG. 12 is a flowchart further illustrating an exemplary process for partitioning in an embodiment consistent with the subject matter of this disclosure.

FIG. 12 is a flowchart illustrating exemplary processing, with respect to act 1102, in one embodiment consistent with the subject matter of this disclosure. The process may begin with a processing device, such as, processing device 100, or another processing device, determining whether strokes in a region can be divided into two disjoint regions (act 1202). If the strokes in the region can be divided into two disjoint regions, then the processing device may partition the strokes of the region into two disjoint regions (act 1204). The processing device may then repeat acts 1202-1204, as long as the region is divisible into two disjoint regions.

If the processing device determines that the region cannot be divided into two new disjoint regions, at act 1202, then the processing device may determine whether there are other regions that may be divided (act 1206). If there are other regions, then processing device may select a next region (act 1208) and the processing device may repeat acts 1202-1204 with respect to the newly selected region.

Figure 13:
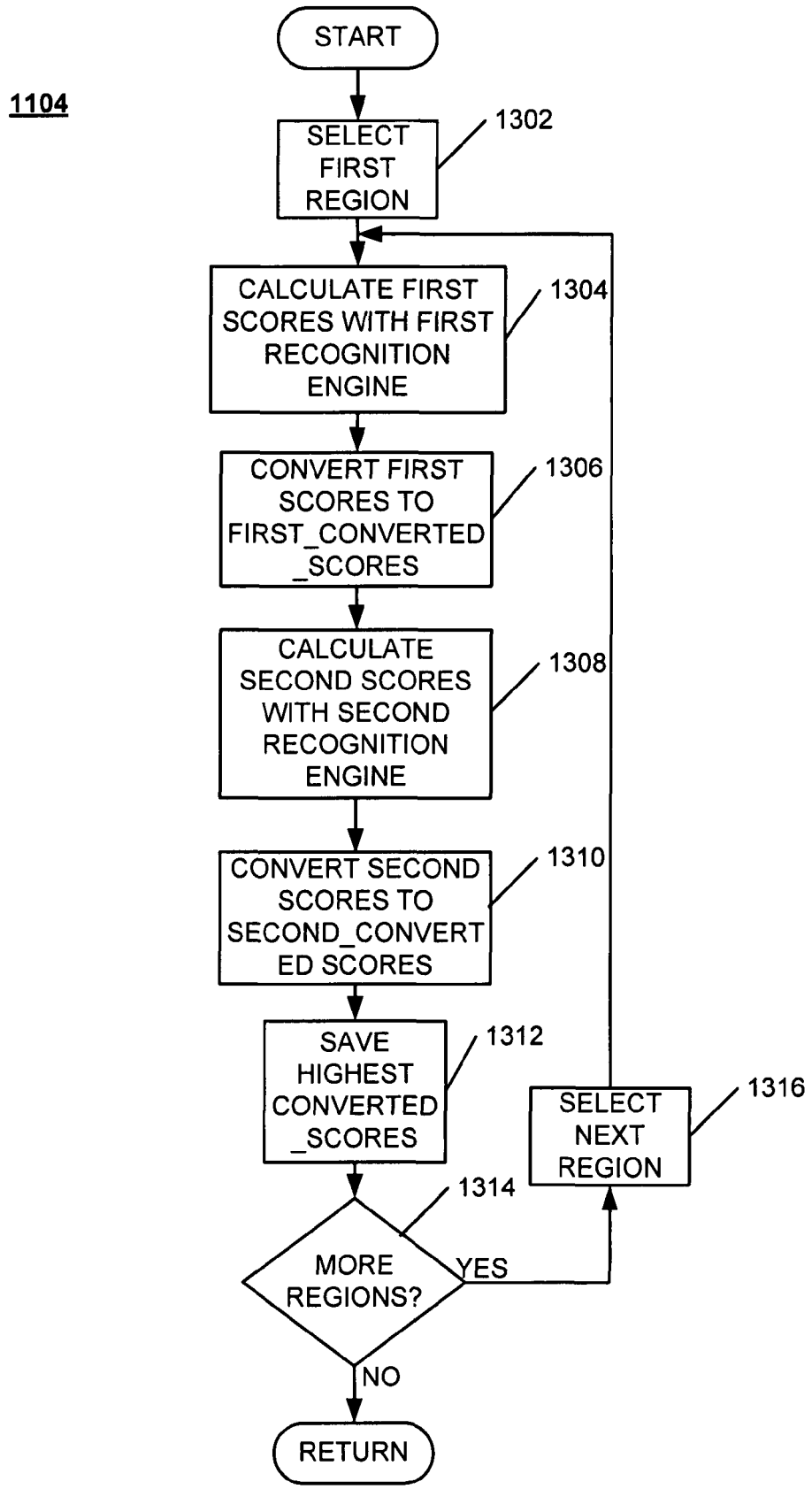
FIG. 13 is a flowchart further illustrating an exemplary process for calculating scores for regions in an embodiment consistent with the subject matter of this disclosure.

Returning to FIG. 11, the processing device may calculate scores for non-terminal grammar objects and terminal grammar objects on each of the regions (act 1104; FIG. 11). FIG. 13 illustrates an exemplary process which may be executed by the processing device to calculate scores for each of the regions. The process may start with the processing device selecting a first region, which, initially, may include all of the input strokes forming a mathematical expression (act 1302). The processing device may then calculate first scores for non-terminal grammar objects on the region using a first recognition engine or recognizer (act 1304). The processing device may then convert the first scores to first converted scores (act 1306). In one embodiment, the first converted scores may be calculated according to equation 3. In other embodiments, other formulas may be used to calculate the first converted score.

Next, the processing device may calculate second scores for all terminal grammar objects on the region using a second recognition engine or recognizer (act 1308). The processing device may then convert the second scores to second converted scores (act 1310). In one embodiment, the second converted score may be calculated according to equation 4. In other embodiments, other formulas may be used to calculate the second converted score.

The processing device may then save highest scores for each non-terminal grammar object in the region to chart entries and highest scores for each terminal grammar object in the region to the chart entries (act 1312). That is, the highest value from among the first converted scores for each non-terminal grammar object in the region and the highest score from among the second converted scores for each terminal grammar object in the region may be saved to the chart entries.

The processing device may then determine whether any other regions are to be scored (act 1314). If no other regions are to be scored, then the process is completed. Otherwise, the processing device may select a next region for scoring (act 1316) and acts 1304-1316 may be repeated.

Returning to FIG. 11, the processing device may then recognize the input strokes forming the mathematical expression (act 1106; FIG. 11). In one embodiment, the processing device may determine a recognition result, as well as alternate recognitions, by determining a highest converted score (and next highest converted scores for alternate recognitions), with respect to the recurrence formula (see equations 1, 3 and 4). The processing device may then present a recognition result to the user (act 1108).

Correction Hints

In embodiments consistent with the subject matter of this disclosure, a user may detect one or more misrecognized strokes by viewing a recognition result having at least one error. The user may select the one or more misrecognized strokes, or a misrecognized portion of the recognition result, using a writing instrument, a pointing device, or other device, and the processing device may respond by displaying one or more alternate recognitions. The one or more alternate recognitions may be displayed in a drop-down list, or a submenu. The alternate recognitions may have next highest scores, as computed by a recognizer and converted to a converted score. When the user selects one of the displayed one or more alternate recognitions, the selected alternate recognition may then be processed by the processing device and input strokes re-recognized. In some embodiments, the user may rewrite a portion of the mathematical expression instead of selecting an alternate recognition. A selected alternate recognition may be called a correction hint.

After the user provides a correction hint, the processing device may re-recognize the strokes, while respecting the correction hint. If a new recognition result includes an error, the user may provide a new correction hint.

In embodiments consistent with the subject matter of this disclosure, a user may select a misrecognized symbol, one or more strokes that are part of a single recognized symbol, or one or more strokes that are part of a misrecognized structure, and the processing device may present one or more alternate symbol recognitions, one or more alternate structure recognitions, or both one or more alternate symbol recognitions and one or more alternate structure recognitions from which the user may select a correct recognition.

Rather then replacing the previously calculated and converted scores of chart entries, any chart entry representing a grammar object that breaks, or does not conform to correction hints may be penalized with a negative score. That is, a penalty function may be added to the converted score for a region not conforming to correction hints.

Figure 14:
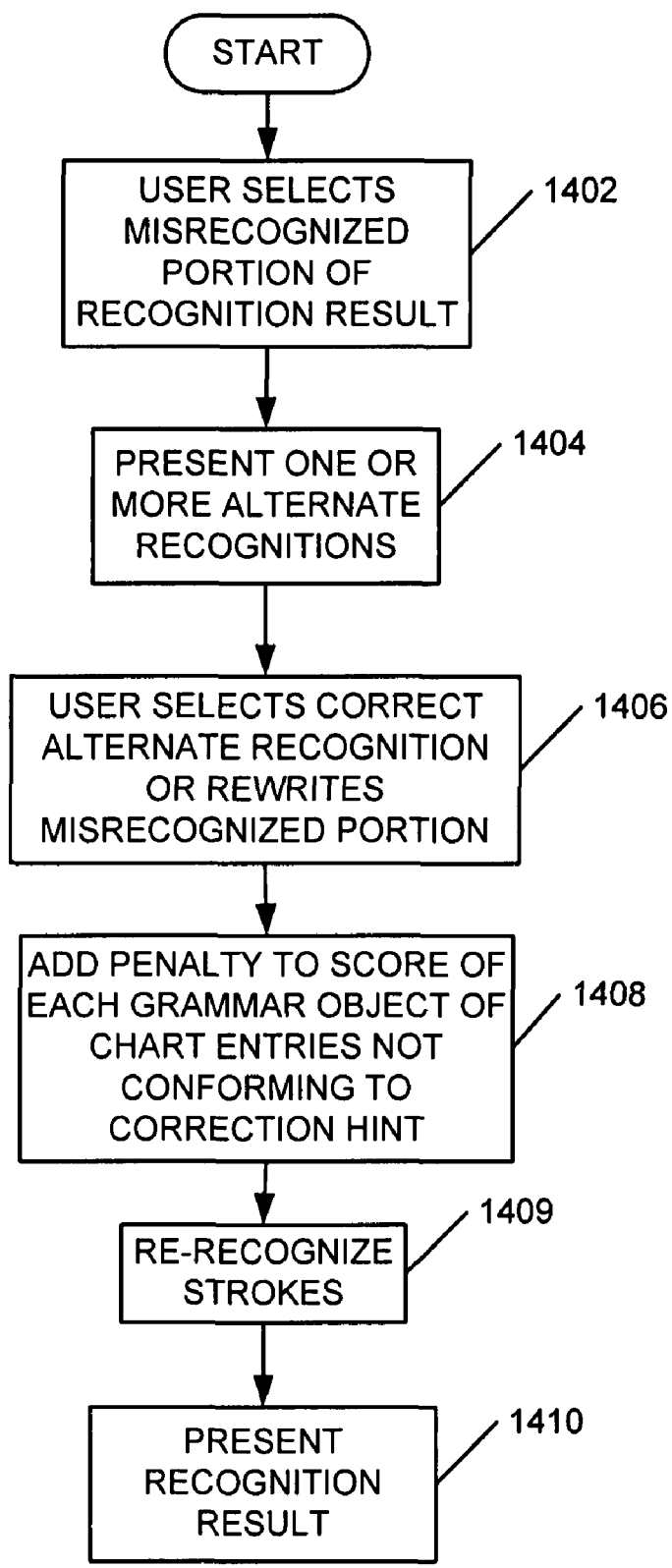
FIG. 14 is a flowchart illustrating an exemplary process for inputting a correction hint and considering the correction hint during scoring of a region.

FIG. 14 illustrates an exemplary process, which may be performed by a processing device in embodiments consistent with the subject matter of this disclosure. The exemplary process may add a penalty to a converted score for chart entries not conforming to one or more correction hints. The process may begin with a user selecting one or more misrecognized input strokes, or selecting a misrecognized portion of a presented recognition result on a processing device (act 1402). The processing device may then present one or more alternate recognitions to the user (act 1404). The processing device may present one or more alternate symbol recognitions, one or more alternate structure recognitions, or both one or more alternate symbol recognitions and one or more alternate structure recognitions from which the user may select a correct recognition.

The user may select a correct symbol, or a correct structure from among the one or more presented alternate recognitions (act 1406). The selected correct symbol or the selected correct structure may be considered a correction hint. The processing device may add a penalty score to each chart entries representing a grammar object having strokes not conforming to the correction hint, or correction hints (if multiple correction hints are provided) (act 1408).

Figure 15A:
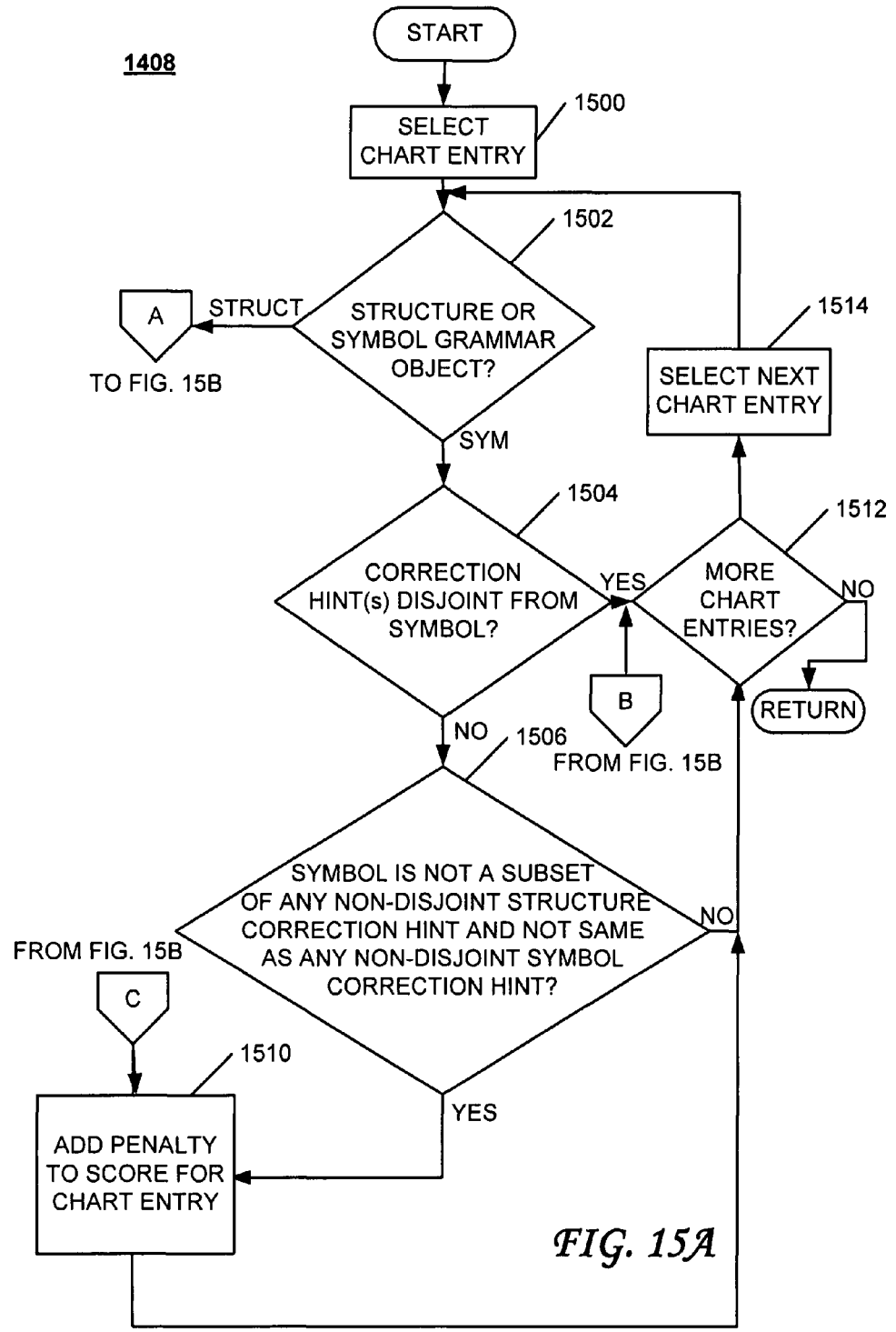
FIGS. 15A and 15B are flowcharts illustrating an exemplary process for determining whether a region breaks a correction hint and adding a penalty score to a score for a region breaking the correction hint.
Figure 15B:
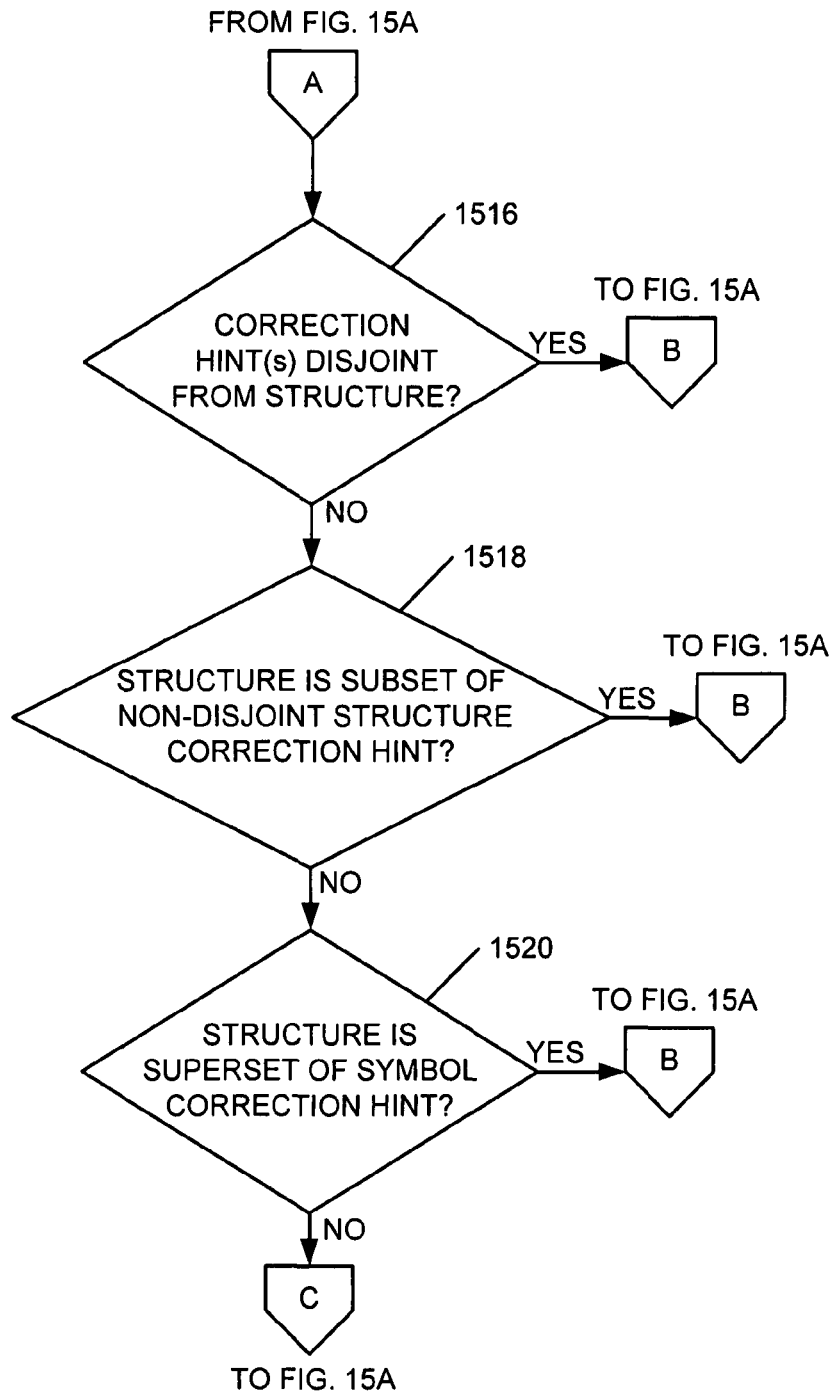

FIGS. 15A and 15B are flowcharts of an exemplary process, which may be performed by a processing device in embodiments consistent with the subject matter of this disclosure. The exemplary process determines whether a grammar object represented by a chart entry conforms to one or more correction hints and, if not, adds a penalty score to a score for the chart entry.

The process may begin with the processing device selecting a chart entry representing a grammar object (act 1500). The processing device may then determine whether the grammar object is a structure (or non-terminal) grammar object or a symbol (or terminal) grammar object (act 1502).

If the chart entry represents a symbol (or terminal) grammar object, then the processing device may determine whether the strokes of the terminal grammar object are disjoint from any and all correction hints (act 1504). If so, then the processing device may determine whether more chart entries are to be examined (act 1512). If no more chart entries are to be examined, then the process is completed. Otherwise, the processing device may select a next chart entry (act 1514) and act 1502 may be repeated.

If, during act 1504, the processing device determines that the strokes of the terminal grammar object (symbol) are not disjoint from any and all correction hints, then the processing device may determine whether the symbol is not a subset of any non-disjoint structure correction hint and not the same symbol included in any non-disjoint correction hint (act 1506). If the symbol is not a subset of any non-disjoint structure correction hint and not the same symbol as (contradicts) any non-disjoint correction hint, then a penalty, such as, for example, a negative score may be added to a score for the chart entry, such as, for example a converted score.

If, during act 1506, the processing device determines that the symbol is a subset of any of the non-disjoint structure correction hints, or the symbol is the same as (conforms with) any non-disjoint symbol correction hint, then a penalty may not be added to the score for the chart entry.

The processing device may perform acts 1512-1514 to select a next chart entry, if one is available. If a next chart entry is not available, then the process is completed.

If, during act 1502, the processing device determines that the chart entry represents a non-terminal grammar object (structure), then the processing device may determine whether all of the correction hints are disjoint from structure (act 1516; FIG. 15B). If all of the correction hints are disjoint from the structure, then the processing device may perform acts 1512-1514 (FIG. 15A) to select a next chart entry, if one is available. Otherwise, the processing device may determine whether the structure is a subset of a non-disjoint structure correction hint (act 1518). If the structure is a subset of a non-disjoint structure correction hint, then the processing device may perform acts 1512-1514 (FIG. 8A) to select a next chart entry, if one is available. Otherwise, the processing device may determine whether the structure is a superset of a symbol correction hint (act 1520). If the structure is a superset of a symbol correction hint, then the processing device may perform acts 1512-1514 (FIG. 15A) to select a next chart entry, if one is available. Otherwise, a penalty, such as, for example, a negative score may be added to a score for the chart entry, such as, for example a converted score (act 1510).

Returning to FIG. 14, the processing device may re-recognize the strokes, taking into consideration updated scores and a recurrence formula, equation 1 (act 1409). The processing device may then present a recognition result to the user (act 1410). The recognition result may be based on determining a highest score according to equations 1, 3 and 4, as previously discussed.

Incremental Recognition

A user may enter a mathematical expression, into a processing device, stroke by stroke as digital ink. When entering a long mathematical expression, the user may pause one or more times between strokes. In some embodiments consistent with the subject matter of this disclosure, a processing device may recognize entered strokes and may present an intermediate recognition result to the user. Such recognition of entered strokes may be called incremental recognition. The user may review the recognition result and may correct an error immediately, or the user may continue entering strokes of the mathematical expression and correct any errors after completing entry of the strokes. The user may alter the entered strokes by, for example, deleting the one or more strokes, adding the one or more strokes, or rewriting over entered strokes, as well as by other methods.

Figure 16:
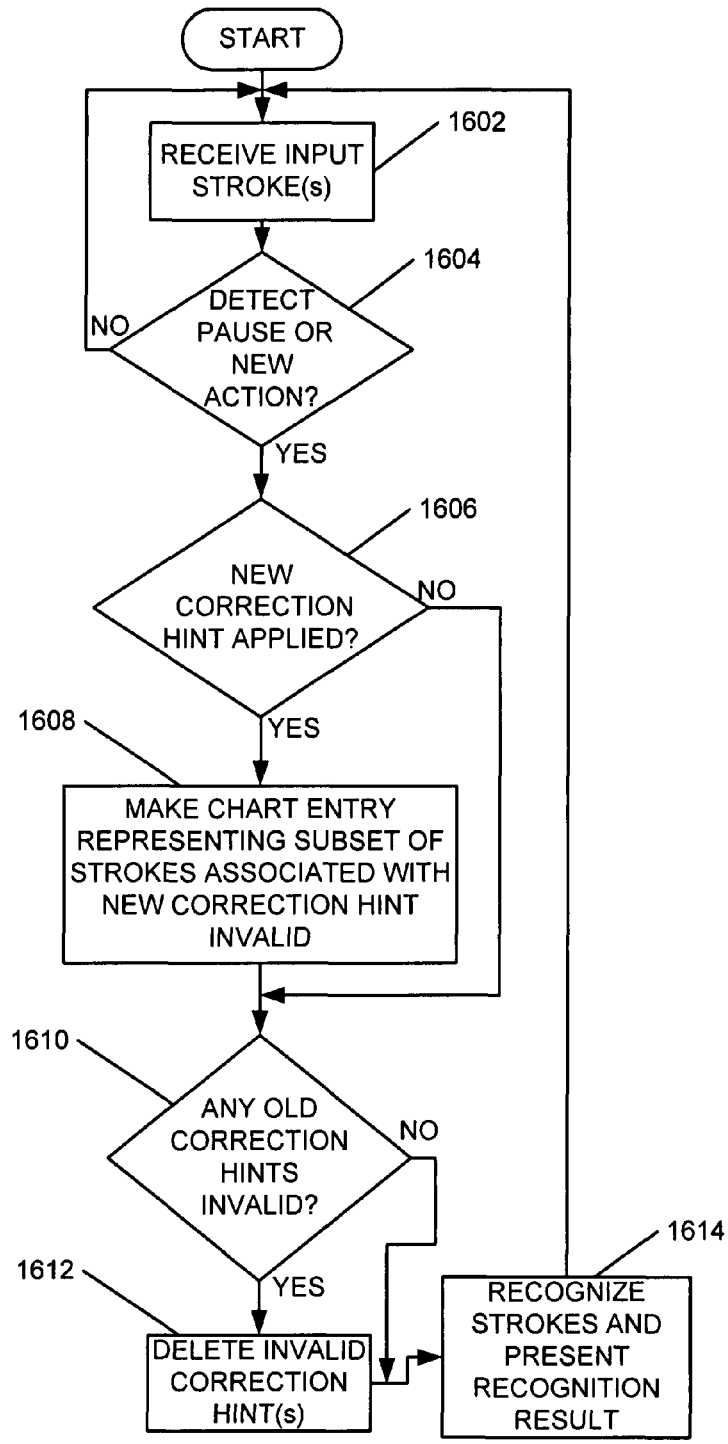
FIGS. 16 and 17 are flowcharts of exemplary processes for performing incremental recognition in an embodiment consistent with the subject matter of this disclosure.

FIG. 16 is a flowchart illustrating an exemplary process, which may be performed in embodiments consistent with the subject matter of this disclosure, to incrementally recognize strokes of a mathematical expression entered into a processing device by a user. The process may begin with the processing device receiving one or more input strokes from the user or a selection of an alternate recognition (act 1602). The one or more input strokes may include new strokes for the mathematical expression, an indication of one or more deleted strokes, or one or more strokes to replace previously entered strokes (rewrite).

Next, the processing device may determine whether a pause or a new action is detected (act 1604). In one embodiment, the pause may be a time period, such as, for example, 0.5 seconds, or another time period between two incremental recognitions. During incremental recognition, a number of actions may occur between two incremental recognitions. In one embodiment, the actions may include 1) addition of one or more new strokes, 2) deletion of one or more strokes, 3) replacement of one or more strokes (rewrite feature), and 4) application of an alternate recognition. Incremental recognition may be performed when any one action occurs between incremental recognitions or when a pause is detected during input. In some embodiments, no more than one action may be permitted between incremental recognitions.

The processing device may then determine whether a new correction hint was applied (act 1606). If a new correction hint was applied, then a chart entry representing a subset of strokes associated with the new correction hint may be marked as invalid (act 1608).

Next, the processing device may determine whether any old correction hints are now invalid (act 1610). An old correction hint may become invalid if the old correction hint includes a stroke that has been deleted or if the old correction hint contradicts a new correction hint (where the new correction hint concerns a same subset of strokes as the old correction hint). If any old correction hints are invalid, then the processing device may delete the invalid correction hints (act 1612). Deletion of a correction hint may include deleting an effect of adding a penalty score to scores of chart entries representing grammar objects breaking the old correction hint. That is, the penalty score is no longer added to a score for a chart entry breaking the old correction hint.

The processing device may then recognize strokes and present a new recognition result (act 1614). The processing device may then repeat acts 1602-1614.

Figure 17:
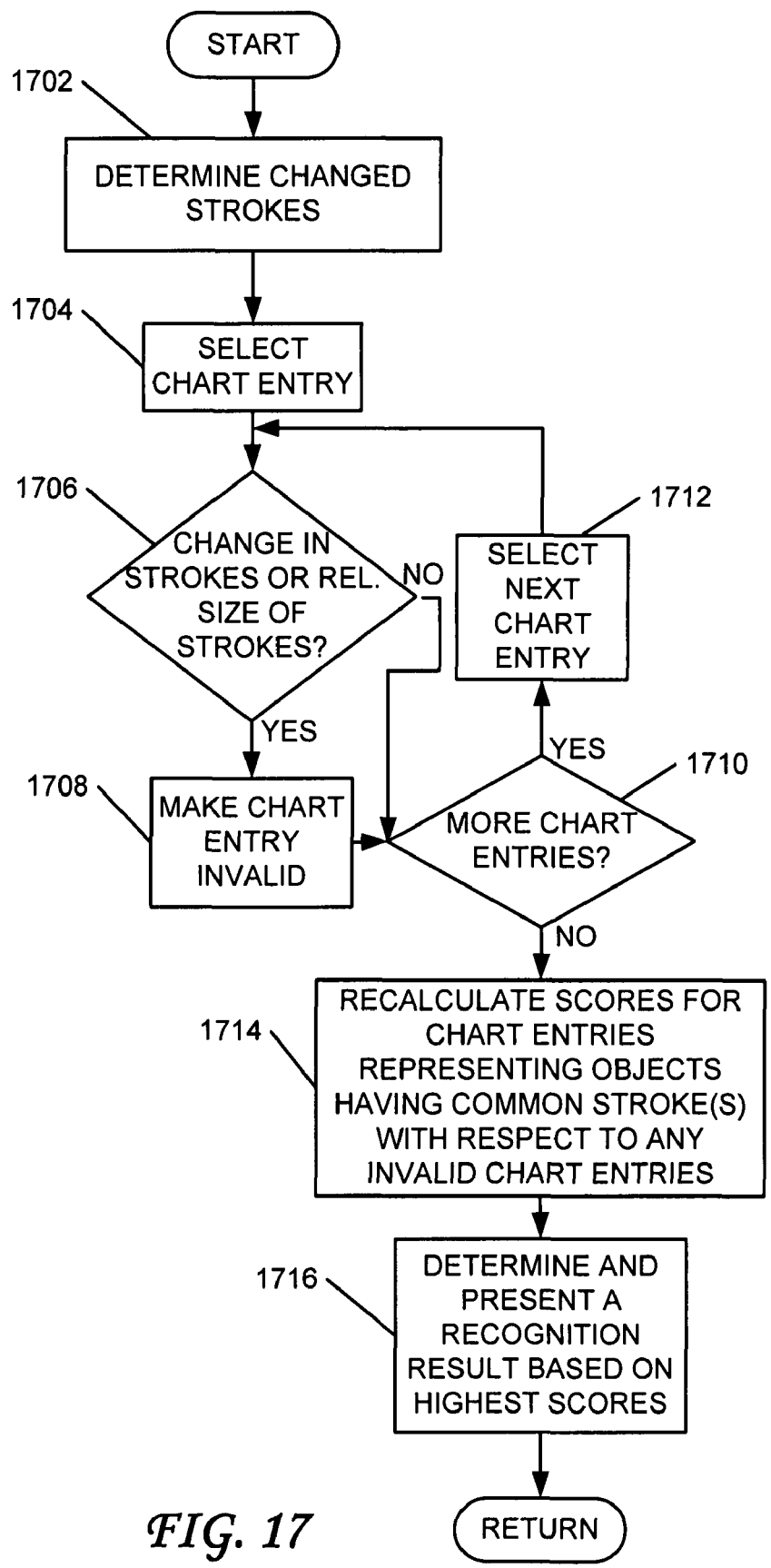

FIG. 17 is a flowchart of an exemplary process, which may be performed in embodiments consistent with the subject matter of this disclosure when performing act 1614 of FIG. 9. First, the processing device may determine changed strokes since a last incremental recognition (act 1702). Next, the processing device may select a chart entry representing a subset of the entered strokes (act 1704).

In one embodiment, relative symbol size may be a parameter to the second recognizer (for recognizing symbols or terminal grammar objects). In such an embodiment, the processing device may determine whether the chart entry represents any changed strokes or whether strokes represented by the chart entry have a different relative size with respect to a previous incremental recognition (act 1706). The relative size of the strokes may be one of: small, small_medium, medium, large_medium, and large. Certain symbols, such as, for example, an apostrophe, a comma, a vertical bar, a backslash, as well as other symbols, look very similar, and sometimes, relative symbol size compared with other symbols may help distinguish a symbol being recognized. In other embodiments, the relative size of the strokes may include different, or other relative sizes.

In embodiments in which the first recognizer or the second recognizer depends on other parameters, which could be changed by adding or deleting strokes of digital ink, another procedure may be implemented for checking whether a score provided by a first recognizer or a second recognizer for a given chart entry should be updated.

If the chart entry represents any changed strokes (with respect to relative size) or the strokes represented by the chart entries changed with respect to the previous incremental recognition, then the processing device may make the chart entry invalid (act 1708). Next, the processing device may determine whether more chart entries exist (act 1710). If more chart entries exist, then the processing device may select a next chart entry (act 1712) and the processing device may again perform acts 1706-1712.

If, during act 1710, the processing device determines that all chart entries have been selected, then the processing device may find chart entries representing objects having a stroke in common with strokes represented by an invalid chart entry and the processing device may recalculate scores for such chart entries (act 1714). In some embodiments, the scores may be recalculated by a first recognizer scoring chart entries of non-terminal grammar objects and a second recognizer scoring all chart entries of terminal grammar objects to produce first scores and second scores, respectively. The first scores or the second scores may then be converted to converted scores. In one embodiment, the first scores and the second scores may be converted using equation 3, or equation 4, respectively. The processing device may then present a recognition result based on highest scores (act 1716).

Thus, according to the exemplary process of FIG. 17, the processing device may reuse previously calculated scores of chart entries having no changed strokes and having no strokes in common with an invalid chart entry.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

The invention claimed is:

1. A machine-implemented method for recognizing a handwritten mathematical expression, the machine-implemented method comprising:
    partitioning a plurality of strokes of the handwritten mathematical expression, included in a region having at least one non-terminal object, into one or more groups of two regions;
    repeating the act of partitioning on ones of regions included in the one or more groups of two regions having a non-terminal object;
    using a first recognizer and a second recognizer to calculate first scores and second scores, respectively, of chart entries representing grammar objects formed from one or more strokes included in the regions;
    calculating first converted scores and second converted scores from the first scores and the second scores, respectively, each of the converted scores being calculated according to:

$$\text{converted\_score} = T \times dir \times \frac{\text{score} - m}{d},$$

where converted score is the converted score, T is a parameter obtained during training for the first recognizer or the second recognizer, correspondingly, score is a score from the first recognizer or the second recognizer, correspondingly, m is a mean score with respect to sample scores of the first recognizer or sample scores of the second recognizer, correspondingly, d is a sample deviation of the sample scores of the first recognizer or the sample scores of the second recognizer, correspondingly, and dir is a direction constant with respect to the first recognizer or the second recognizer, correspondingly;
    determining a respective converted score for each of the regions based on highest scores selected from corresponding first converted scores and corresponding second converted scores; and
    recognizing the plurality of strokes of the mathematical expression based on finding highest converted scores of partitioning of the plurality of strokes, wherein
    the machine-implemented method is performed by at least one processor.

2. The machine-implemented method of claim 1, wherein training of the first recognizer is independent of training of the second recognizer.

3. The machine-implemented method of claim 1, wherein the converted scores of the regions have at least a near standard normal distribution.

4. The machine-implemented method of claim 1, further comprising:
    receiving a correction hint with respect to at least one misrecognized stroke;
    adding a penalty to scores of ones of the regions having at least one stroke breaking the correction hint; and
    repeating the act of recognizing the plurality of strokes of the mathematical expression based on finding highest converted scores of partitioning of the plurality of strokes.

5. The machine-implemented method of claim 1, further comprising:

performing an incremental recognition of entered ones of the plurality of strokes.

6. The machine-implemented method of claim 1, further comprising:

performing an incremental recognition of entered ones of the plurality of strokes, the performing of the incremental recognition further comprising:

recalculating ones of the first scores or ones of the second scores, correspondingly, for ones of the chart entries representing grammar objects having a change of at least one stroke; and reusing ones of the first scores or ones of the second scores, correspondingly, for ones of the chart entries representing grammar objects having no changed strokes with respect to a previous incremental recognition.

\* \* \* \* \*